March 24, 1964 C. F. PULVARI 3,126,509
ELECTRICAL CONDENSER HAVING TWO ELECTRICALLY
OPPOSITE ONE-WAY POTENTIAL BARRIERS
Filed July 27, 1956 2 Sheets-Sheet 2
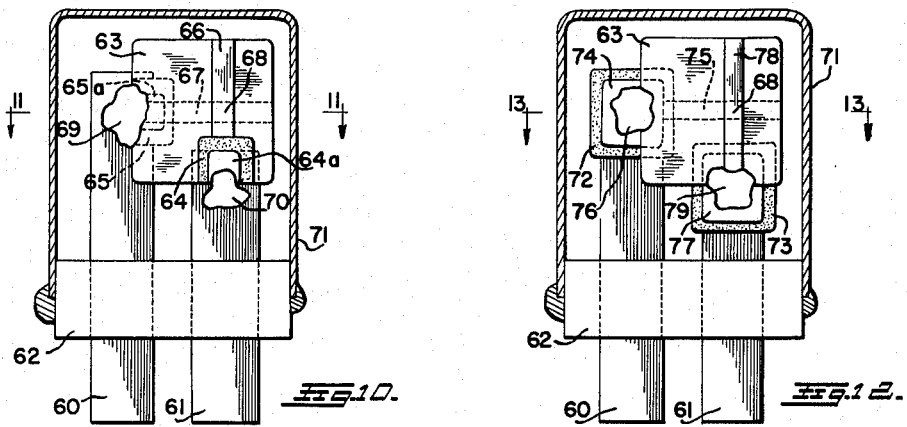
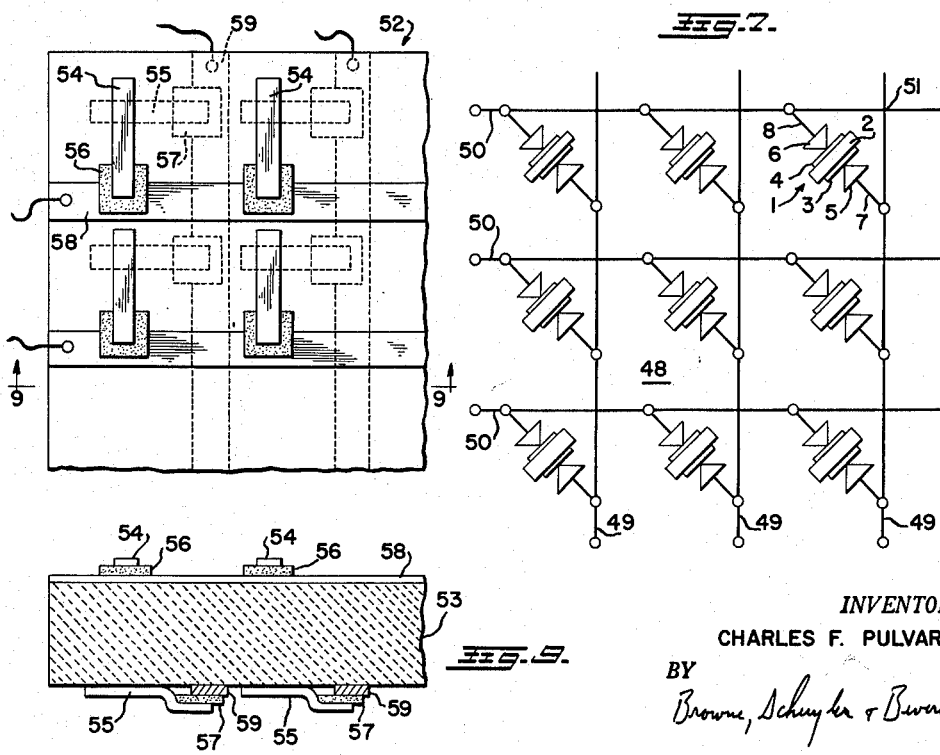
INVENTOR.
CHARLES F. PULVARI
BY
Browne, Schuyler & Beveridge

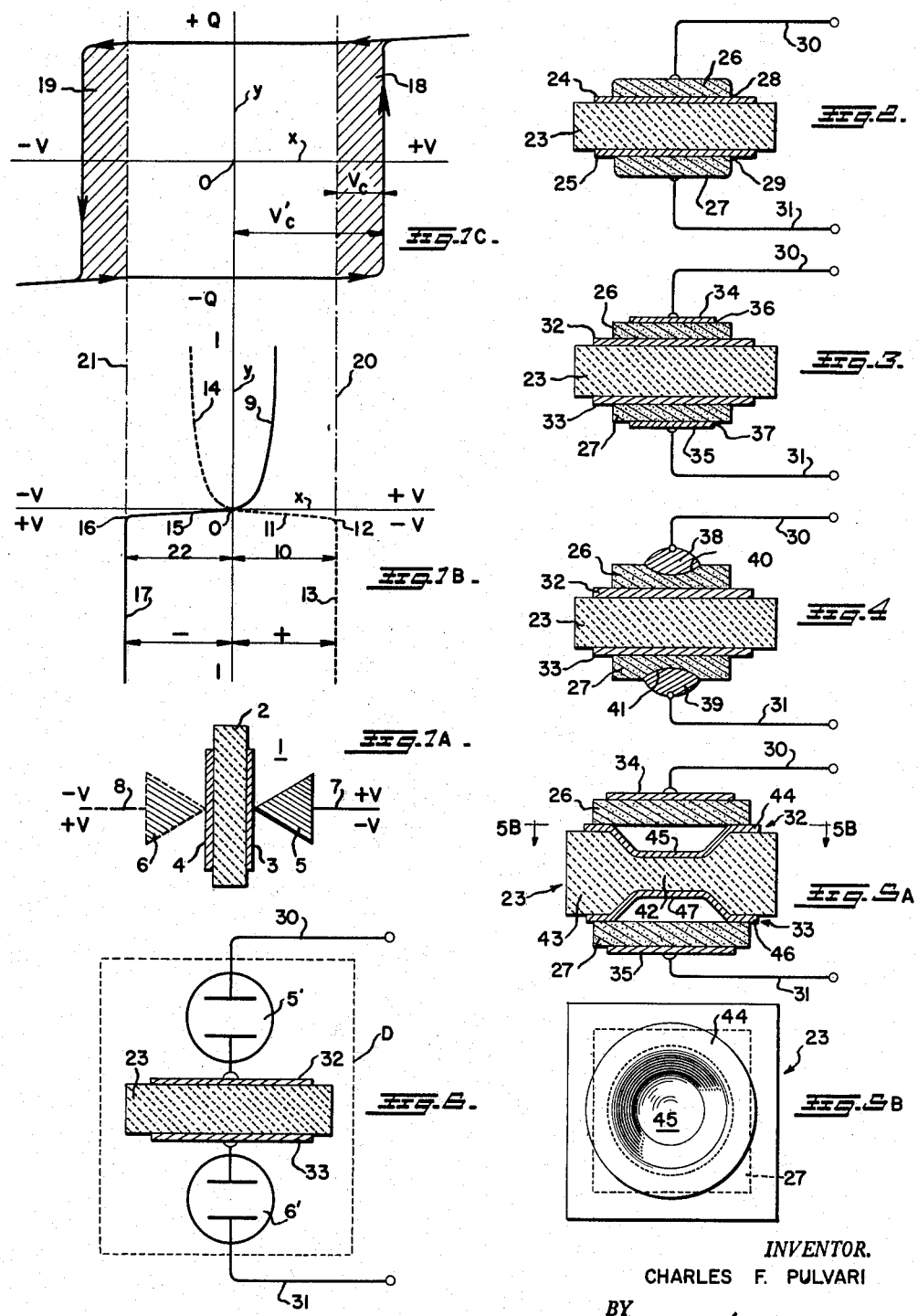

United States Patent Office 3,126,509
Patented Mar. 24, 1964

3,126,509
ELECTRICAL CONDENSER HAVING TWO ELECTRICALLY OPPOSITE ONE-WAY POTENTIAL BARRIERS
Charles Ferencz Pulvari, 2014 Taylor St. NE., Washington, D.C.
Filed July 27, 1956, Ser. No. 600,588
7 Claims. (Cl. 323—74)

This invention relates to electrical condensers and more particularly to electrical condensers useful, among other purposes, for storing bits of information and capable of being switched to record and reproduce bits of information.

In my pending United States patent application Serial No. 145,361, filed February 21, 1950, now Patent No. 2,793,288, issued May 21, 1957, I disclose condensers useful for information storage purposes, in memories for example, wherein the condenser dielectric is a material having electric dipoles therein which may be aligned and the alignment of which may be changed to record information in the condenser or to reproduce information from condenser. I also disclose that a ferroelectric material is a preferred material for such a dielectric. I have found that if the ferroelectric dielectric is composed of single crystals having an anti-parallel c-domain structure then substantially rectangular hysteresis loops are obtained when the condenser is operated.

My further research revealed that while a condenser having such a single crystal ferroelectric dielectric is fully operative for the purpose intended, it lacks sufficient retentivity stability at times, particularly if it is incorporated in a multicondenser matrix so that it may be subjected to electrical pulses even though it is an unselected cross point of the matrix. This type of stability may be termed the stability of retentivity meaning that if a polarization is established in the condenser dielectric representing, for example, a bit of information, then this polarization should remain practically unchanged for a long period of time unless, of course, some intended action is taken to change the polarization. In other words, the condenser should be able to retain a bit of information put into it until the condenser is "asked" in the intended manner to give up its bit of information. This problem is further described in my pending United States patent application Serial No. 381,347, filed September 21, 1953, now Patent No. 2,884,617, issued April 28, 1959.

Efforts have been made by those skilled in the art to which this invention pertains to improve the selection ratio of a ferroelectric condenser matrix so that unselected condensers, or cross points, of the matrix will not be changed in polarization (and thus produce unwanted or false signals) when an intended condenser, or cross point, is being acted upon to obtain a signal therefrom which may represent, for example, a bit of information. However, insofar as I am aware, the line of attack has been directed primarily toward circuitry associated with ferroelectric condensers, such as driver circuitry for example, rather than toward the condenser itself. It is true that there is a continuing effort by those skilled in the art to obtain better ferroelectric materials in the sense that the materials have greater rectangularity, i.e. nonlinearity in their hysteresis loops. However, the increase of nonlinearity has its inherent physical limitations due to the maximum possible displacement and the switching time associated with the reversal of such displacement. Such efforts therefore have not, to my knowledge, resulted in a foolproof ferroelectric condenser wherein the nonlinearity or coercive voltage required to change the polarization of the condenser dielectric could be increased sufficiently to obtain greater selectivity in switching a multicondenser structure.

In making the present invention, I have attacked the problem of obtaining greater selectivity by, so to speak, proceeding along a line of attack directed to the ferroelectric condenser itself rather than proceeding along a line of attack directed to circuitry associated with the condenser. Furthermore, my attack was directed toward providing a condenser having an improved stability of retentivity because of its additional coercive voltage properties rather than merely providing one having an improved rectangularity or nonlinearity of hysteresis loops.

It is important to note that the present invention permits the practical use of ferroelectric materials which could not be used heretofore because of their inherent multidomain structure or lack of sufficient nonlinearity. An example of such a ferroelectric material is potassium niobate ($KNbO_3$) which has excellent high temperature characteristics but which, due to its presently known crystal growth technique, does not yield uniform single domain single crystals. The present invention therefore not only permits an increase in the coercive voltage of a ferroelectric storage condenser without increasing, in effect, the heat loss in the dielectric but also permits at the same time an increase in nonlinearity since the reverse characteristic of a barrier layer of a silicon semi-conductor exhibits possibly the highest nonlinearity known, particularly when the Zener region is considered.

It is therefore a general object of my invention to provide a new and improved condenser having a dielectric with electric dipoles therein which may be aligned and the alignment of which may be changed and wherein the condenser has improved retentivity stability.

It is another object of my invention to provide such a condenser in which the coercive voltage required to change the polarization of the dielectric may be chosen so as to assure improved retentivity stability.

It is another object of my invention to provide such a condenser which includes two electrically opposite one-way potential barriers.

It is another object of my invention to provide new and improved methods of making such a condenser.

It is another object of my invention to provide new and improved a multicondenser matrix including such condensers.

It is another object of my invention to provide new and improved holders for such condensers.

Briefly described, I obtain improved retentivity stability in a condenser having a ferroelectric dielectric, for example, by incorporating in the condenser, between the dielectric and each condenser terminal, a member which presents a one-way potential barrier so that a potential barrier is presented to a voltage applied to the condenser irrespective of the direction of the applied voltage. This is done by arranging the potential barrier members in electrically opposed relation to each other within the condenser. As one example, the condenser comprises a ferroelectric dielectric layer consisting of barium titanate single crystals having a homogeneous domain structure, which is sandwiched between a pair of thin metal layers, aluminum or gold for example, joined to the dielectric; a layer of electrically semi-conductive material, silicon for example, joined to each metal layer on the side thereof away from the dielectric; and a condenser terminal connected to each layer of semi-conductive material on the side thereof away from the metal layer to which said semi-conductive layer is joined.

As will be appreciated by those skilled in the art, the junction between each layer of semi-conductive material and its associated metal layer provides a potential barrier layer having the electrical property of presenting an extremely high impedance to a voltage applied to said junction in one direction as compared to a voltage applied to said junction in the opposite direction. In diode terminology such a barrier layer has a low forward and high back resistance or avalanche characteristic, i.e. a Zener region of operation. When the avalanche voltage is reached valence electrons are excited into the conduction band and the diode breaks down and becomes conductive. Up to that time it effectively insulates the dielectric from the applied voltage so that, for all practical purposes, the condenser is open-circuited. In dry rectifier terminology, it may be considered that the back resistance of the rectifier is presented to an applied voltage thus, again the dielectric is practically insulated from the applied voltage until the back resistance is overcome. Since the barrier layers are in electrically opposed relation, when the avalanche point of either one is reached by an applied voltage, the other one presents no appreciable opposition to the applied voltage inasmuch as the applied voltage, insofar as the other barrier layer is concerned, is applied in its forward conducting direction. By properly choosing the avalanche point of such a barrier layer it is readily possible to, in effect, raise the coercive voltage of each ferroelectric condenser of a multi-condenser matrix so that unselected condensers will not be disturbed by a fractional pulse or pulses of lesser magnitude, such as for instance a half pulse, than what is being applied to a selected condenser to change its polarization.

Other objects and advantages of the present invention will become more apparent from the following detailed description taken in conjunction with the attached drawings in which:

FIG. 1A is a schematic representation of a condenser according to the present invention;

FIGS. 1B and 1C are diagrammatic showings of electrical characteristics applicable to a condenser according to the present invention;

FIG. 2 is a sectional view of a condenser according to one embodiment of the present invention;

FIG. 3 is a sectional view of a condenser according to another embodiment of the present invention;

FIG. 4 is a sectional view of a condenser according to another embodiment of the present invention;

FIG. 5A is a sectional view of a condenser according to another embodiment of the present invention;

FIG. 5B is a view of the condenser shown in FIG. 5A taken on line 5B—5B of FIG. 5A;

FIG. 6 is a circuit diagram of a condenser according to the present invention from a diode aspect;

FIG. 7 shows a multicondenser matrix wherein each condenser of the matrix is a condenser having improved retentivity stability according to the present invention;

FIG. 8 is a top view of another form of multicondenser matrix;

FIG. 9 is a sectional view of the matrix shown in FIG. 8 taken on line 9—9 of FIG. 8;

FIG. 10 is an elevation view, partly in section, of a holder or support and housing for a condenser according to the present invention;

FIG. 11 is a sectional view taken on line 11—11 of FIG. 10;

FIG. 12 is a view similar to FIG. 10 showing a modified arrangement for providing the potential barrier layers; and FIG. 13 is a sectional view taken on line 13—13 of FIG. 12.

Referring now to FIGS. 1A, 1B, and 1C, it will be noted that these figures are arranged in a vertical alignment. The reason for this, which will be more apparent as the detailed description proceeds, is because FIGS. 1B and 1C show electrical characteristics of the condenser shown schematically in FIG. 1A and the arrangement of FIGS. 1B and 1C with respect to each other other and with respect to FIG. 1A is thought to give a clearer understanding of the nature and operation of the condenser shown schematically in FIG. 1A.

Referring now more specifically to FIG. 1A, an electrical condenser 1 according to the present invention is depicted schematically as comprising a layer of dielectric material 2 sandwiched between a pair of condenser electrodes 3 and 4. Dielectric 2 is a dielectric material having electric dipoles therein which may be aligned and the alignment of which may be changed in a remanent manner. For example, dielectric 2 is preferably a ferroelectric dielectric composed of single crystals having an anti-parallel c-domain structure. Condenser electrodes 3 and 4 are made of a material, a suitable metal for example, which, in cooperation with said dielectric, provides highly non-linear hysteresis loops when the condenser is operated.

The assembly of dielectric 2 and electrodes 3 and 4 is shown in FIG. 1A as being located between condenser elements 5 and 6. These elements are represented by a triangular configuration since this shape can be understood by those skilled in the art as representing an element which is a rectifier in the sense that it has a high back resistance and a low forward resistance. To describe it another way, the assembly of electrode 3 and element 5, and likewise the assembly of electrode 4 and element 6, presents a potential barrier layer to an electrical potential applied to the element concerned in a direction going against its back resistance. Thus, referring to FIG. 1A, the assembly of electrode 3 and element 5 presents a potential barrier to a potential increasing from left to right as shown in FIG. 1A. Similarly, the assembly of electrode 4 and element 6 presents a potential barrier to a potential increasing from right to left as viewed in FIG. 1A. The potential barriers are therefore seen to be in electrically opposed relation so that condenser 1 presents a potential barrier to an electrical potential applied across condenser leads 7 and 8 irrespective of the direction of said applied voltage.

While the terms "back resistance" and "forward resistance" are thought to give a fully sufficient description of the basic nature of the potential barriers formed by electrode 3 and element 5 and likewise by electrode 4 and element 6, elements 5 and 6 may be possibly more aptly described according to more modern terminology by calling them "avalanche electrode." According to this terminology, a potential applied to element 5, for example, increasing from left to right as seen in FIG. 1A, encounters the extremely high back impedance of element 5 through a Zener region. Throughout this Zener region, element 5 acts for all practical purposes as an insulator meaning that there is practically an open circuit between leads 7 and 8. However, when the avalanche point, or breakdown voltage, of element 5 is reached then element 5 offers no further appreciable impedance to the applied voltage so that condenser 1 may be switched in polarization assuming that the potential applied is in a proper direction to accomplish such switching and is of sufficient magnitude to accomplish the switching. Element 6 of course offers no appreciable impedance to the applied potential since the potential, insofar as element 6 is concerned, is applied in its forward conducting direction.

What has been described in the preceding paragraph may perhaps be better understood by reference to FIG. 1B wherein the X and Y axes represent electrical voltage and current respectively. Assuming that a voltage is applied across condenser leads 7 and 8 so that lead 7 has a plus voltage (+v.) applied thereto and lead 8 has a minus voltage (−v.) applied thereto, then it is seen that the voltage is applied to element 5 in its forward conducting direction but is applied to element 6 in reverse of the forward conducting direction of this element. Were it not for the presence of element 6, the rise in potential going along the X axis to the right of the 0 point as seen in FIG. 1B would cause element 5 to conduct according to its forward conduction characteristic curve 9 shown in FIG. 1B. However, since element 6 (avalanche electrode 6) is present in condenser 1 in electrically opposite relation to element 5 and since the forward conduction characteristic curve 9 of element 5 lies within the Zener region 10 of element 6, element 5 is blocked from conducting as the electrical potential rises proceeding to the right of the 0 point along the X axis as shown in FIG. 1B until the avalanche point, or breakdown voltage, of element 6 is reached.

The dotted line curve portion 11 shown in FIG. 1B is an exaggerated representation in a Y axis direction of the creep in electrical current going backwards, so to speak, through avalanche electrode 6 as the electrical potential rises to the right along the X axis shown in FIG. 1B until the avalanche point 12 is reached. When the voltage rises sufficiently to reach avalanche point 12 then avalanche electrode 6 breaks down and offers no further appreciable impedance to electrical current flow with the result that the avalanche conduction characteristic curve portion 13 may be considered as practically a straight line parallel to the Y axis. Of course, avalanche electrode 5 offers no appreciable resistance to current flow once avalanche point 12 is reached since characteristic curve 9 shows that this electrode is practically a short circuit for a voltage sufficient to break down avalanche electrode 6.

That the operation is the same for a voltage applied across condenser leads 7 and 8 so that lead 8 is +v. and lead 7 is —v. is believed to be readily evident from FIG. 1B. For such a potential, rising in a direction going along the X axis to the left from the 0 point as shown in FIG. 1B, dotted curve 14 represents the forward conduction characteristic of avalanche electrode 6. Exaggerated solid line 15 represents the reverse characteristic or Zener region characteristic of avalanche electrode 5. Numeral 16 designates the avalanche point (breakdown voltage) of avalanche electrode 5 while solid line 17 shows the rapid rise in current flow which takes place when avalanche point 16 is reached. The characteristic curves applicable to element 5 are shown in solid lines since the periphery of element 5 (in triangular outline) is shown solid while the characteristic curves applicable to element 6 are shown dotted since the periphery (in triangular outline) of element 6 is also shown dotted. It is thought that this enables the characteristic curves to be associated with the corresponding avalanche electrodes more readily.

FIG. 1C shows the significance of the electrical characteristics shown in FIG. 1B in relation to switching a condenser having a dielectric of a material having electric dipoles therein which may be aligned and the alignment of which may be changed in a remanent manner. The two shaded portions 18 and 19 shown in FIG. 1C represent separated halves of a highly non-linear (substantially rectangular) hysteresis loop which, as will be appreciated by those skilled in the art, is a property of a high quality ferroelectric dielectric. In other words, if shaded portions 18 and 19 were to be moved together the result would be a configuration of a hysteresis loop of the character described. Also, if these portions were together, the coercive voltage ($V_c$) would only be of the magnitude indicated in FIG. 1C.

It is noted however from FIG. 1C that shaded portion 18 is separated from the Y axis shown in FIG. 1C by the distance along the X axis represented by the Zener region 10 shown in FIG. 1B. The dot-dash lines 20 and 21 are vertical extensions of avalanche points 12 and 16 respectively in order to show this relation. It is therefore apparent that the shaded portion 19 is likewise separated from the Y axis shown in FIG. 1C by a distance along the X axis of FIG. 1C corresponding to the Zener region 22 shown in FIG. 1B.

This means that for all practical purposes condenser 1 is open-circuited insofar as an applied voltage of lesser magnitude than the avalanche breakdown voltages of avalanche electrodes 5 and 6 is concerned, irrespective of the direction of the applied voltage. When either avalanche point 12 or 16 is reached, however, condenser 1 is, so to speak, back in the circuit with the result that a further voltage rise of the magnitude $V_c$, or larger, will switch the condenser polarization. Nevertheless, it is important to note that the overall coercive voltage required to switch condenser 1 has been increased from the $V_c$ magnitude shown in FIG. 1C to the $V'_c$ magnitude shown in FIG. 1C. One great significance of this is that it enables a matrix (a memory matrix for example) to be operated in a practically foolproof manner in the sense that unselected cross points will not be disturbed (changed in polarization and thus give an unintended signal) by a fractional pulse (such as a half pulse) of lesser magnitude than a pulse being applied to a selected cross point of the matrix. Here again, reference is made to my pending United States patent application Serial No. 381,347, filed September 21, 1953, for a more complete discussion of this problem.

Referring now to FIG. 2 for a showing of the structure of one form of a condenser in accordance with the teaching of the present invention, a dielectric layer 23 is shown as being sandwiched between a pair of condenser electrodes 24 and 25. Dielectric 23 is a material having electric dipoles therein which may be aligned and the alignment of which may be remanently changed. An example of such a dielectric material is a ferroelectric material. A homogeneous ferroelectric dielectric composed of single crystals having an anti-parallel c-domain structure provides highly non-linear (substantially rectangular) hysteresis loops when the condenser is operated.

However, while such a ferroelectric dielectric may be used, it is important to note that the teaching of the present invention permits the practical use of other ferroelectric dielectrics having an inherent multi-domain structure incapable of providing hysteresis loops having a non-linearity (rectangularity) comparable to the aforementioned homogeneous single crystals having an anti-parallel c-domain structure. The reason for this is that the lack in non-linearity of the dielectric is more than compensated for by the non-linearity of the avalanche electrodes forming a part of the condenser. This will be appreciated by those skilled in the art upon viewing FIG. 1C where it will be noted that the region between the dot-dash lines 20 and 21 represents a practically rectangular area and can thus compensate for the fact that the shaded areas 18 and 19 may not be so nearly rectangular as is shown in FIG. 1C. Therefore, a material having a multi-domain structure such as potassium niobate ($KNbO_3$) may be used as a dielectric in a condenser constructed in accordance with the teaching of the present invention even though such a material does not provide a hysteresis loop having the non-linearity of barmium titanate ($BaTiO_3$) having a single crystal anti-parallel c-domain structure. The present invention therefore increases the types of ferroelectric materials which may be used as condenser dielectrics.

The condenser electrodes 24 and 25 are made of a material which, in cooperation with the dielectric, provides non-linear hysteresis loops of the character previously described. A preferred material for the electrodes is a metal. Examples of such a metal are aluminum, and a noble metal such as gold, silver or platinum. The combination of silver and a silver haloid may also be used. The two metal electrodes may be attached to the dielectric layer 23 by a solder joint or they may be formed by evaporating the electrode material on each side of the dielectric 23 to provide the two electrodes 24 and 25.

The assembly of the dielectric 23 and electrodes 24 and 25 is in turn sandwiched between a pair of layers of electrically semi-conductive material 26 and 27. Semi-conductive layers 26 and 27 may be attached to electrodes 24 and 25 by means of a solder joint or they may be deposited by evaporation on the electrodes until a desired thickness of the layers 26 and 27 has been obtained. These layers 26 and 27 are made of an electrically semi-conductive material, silicon or germanium for example, which, in conjunction with electrodes 24 and 25, provides a potential barrier at each side of the ferroelectric dielectric, said barrier having the electrical characteristics described above in connection with FIGS. 1A and 1B. In other words, the junction 28 between semi-conductive layer 26 and electrode 24, and also the junction 29 between semi-conductive layer 27 and electrode 25, possess the electrical property of having a high back impedance and a low forward impedance oriented in accordance with the showing of condenser 1 shown in FIG. 1A.

Condenser leads 30 and 31 are suitably connected to semi-conductive layers 26 and 27 as shown in FIG. 2. Therefore, when a voltage is applied across condenser leads or terminals 30 and 31, the voltage encounters a potential barrier, irrespective of the direction of the applied voltage, until the applied voltage exceeds the avalanche point, or breakdown voltage, of the junction between a semi-conductive layer and its associated condenser electrode. To describe it another way, each electrode 24 and 25 may be described as a solid ionic or metallic conductor which, in conjunction with its associated semi-conductive layer, presents a potential barrier until a potential is applied sufficient to excite valence electrons into the conduction band and breaks down the barrier. This of course occurs at the avalanche point, or break down voltage, which forms the limit of the Zener region of operation. It is noted therefore that until this avalanche point, or break down voltage is reached, the condenser is for all practical purposes open-circuited.

The condenser shown in FIG. 3 of the drawings is generally similar to that shown in FIG. 2 and corresponding reference numerals are used where applicable. Thus, referring to FIG. 3, a dielectric layer 23 is sandwiched between a pair of condenser electrodes 32 and 33. Electrodes 32 and 33 are made of a material which, in conjunction with the dielectric 23 (which is of a type as described above in connection with FIG. 2) provides highly non-linear hysteresis loops when the condenser is operated. Electrodes 32 and 33 are preferably made of a strongly adherent multiple metal deposit such as a noble metal with an additional metal deposit on the top. The assembly of dielectric 23 and electrodes 32 and 33 is sandwiched between a pair of electrically semi-conductive layers 26 and 27 which, as described above in connection with FIG. 2, may be silicon or germanium and these semi-conductive layers may be attached to electrodes 32 and 33 either by soldering them to the electrodes or by depositing them by evaporation.

The condenser shown in FIG. 3 differs primarily from the one shown in FIG. 2 in that the FIG. 3 condenser includes additional layers 34 and 35 between which the assembly of the semi-conductive layers 26, 27, electrodes 32 and 33, and dielectric 23 are sandwiched. Layers 34 and 35 are preferably made of a metal which, in conjunction with the semi-conductive layers 26 and 27, provides oppositely disposed potential barriers 36 and 37 at the junction between layer 34 and semi-conductive layer 26 and between layer 35 and semi-conductive layer 27, respectively.

Condenser leads or terminals 30 and 31 are suitably attached to layers 34 and 35 respectively. When an electrical potential is applied across leads 30 and 31, then, depending upon the direction of the applied voltage, either potential barrier or junction 36 or 37 presents its back impedance (avalanche characteristic) to the applied voltage in manner similar to that described above with respect to potential barriers 28 and 29. Layers 34 and 35 are preferably made of metal. If electrodes 32 and 33 are made of a noble metal such as gold, silver or platinum, then layers 34 and 35 may be made of aluminum, for example. As another example, if electrodes 32 and 33 are made of silver and a silver haloid combination, then layers 34 and 35 may be made of silver. The requirement is simply that layers 34 and 35 in conjunction with their associated respective semi-conductive layers 26 and 27 provide the one-way potential barriers having electrical characteristics as shown in FIG. 1B. All of the various layers may be attached to each other by suitable means such as solder or they may be deposited by evaporation.

The condenser shown in FIG. 4 is similar to that shown in FIG. 3 except that instead of employing layers 34 and 35 attached, respectively, to semi-conductive layers 26 and 27, junction bodies 38 and 39 are employed. The outer surfaces of semi-conductive layers 26 and 27 may be suitably recessed to receive an enlarged droplet of a material which will adhere to the semi-conductive layer with which it is associated to provide a junction or barrier layer having electrical characteristics as shown in FIG. 1B. Bodies 38 and 39, which can be called avalanche electrodes in that they form with semi-conductive layers 26 and 27 the potential barriers or junctions 40 and 41, may be made of a suitable material so as to form a p or n type junction with the semi-conductor.

Referring now to FIGS. 5A and 5B, it is observed that the condenser shown in these figures includes a layer of dielectric material 23 consisting of a thin central portion 42 surrounded by a thicker outer portion 43. Dielectric layer 23 is sandwiched between a pair of electrodes 32 and 33 which conform to the opposite surfaces of dielectric layer 23 as shown in FIGS. 5A and 5B. Thus, electrode 32 includes a portion 44 joined to the thicker dielectric layer portion 43 and a portion 45 joined to the thinner dielectric layer portion 42. Correspondingly, electrode 33 includes a portion 46 joined to the thicker dielectric layer portion 43 and a portion 47 joined to the thinner dielectric layer portion 42.

Electrically semi-conductive layers 26 and 27 are attached to electrode portions 44 and 46 as shown in FIGS. 5A and 5B so that the thin dielectric layer portion 42 is located between the semi-conductive layers but the latter are spaced away from both the thin dielectric layer portion 42 and the electrode portions 45 and 47 which are joined to dielectric layer portion 42. The thin dielectric layer portion 42 is therefore free of the mechanical load of the semi-conductive layers 26 and 27.

Outer layers 34 and 35 are attached to semi-conductive layers 26 and 27 and condenser leads 30 and 31 are connected to these outer layers as shown in FIGS. 5A and 5B. This, of course, is similar to the arrangement shown in FIG. 3. Furthermore the materials of which the dielectric layer 23, electrodes 32 and 33, semi-conductive layers 26 and 27, and outer layers 34 and 35 may be made is the same as has been described above in connection with the condensers shown in FIG. 3. An advantage of the condenser structure shown in FIGS. 5A and 5B is that the thinner switching area or portion 42 provides improved domain stability. For example, if it is assumed that dielectric layer 23 is composed primarily of single crystals of ferroelectric material having an anti-parallel c-domain structure, then the condenser shown in FIGS. 5A and 5B results in an improved retention of such anti-parallel c-domain structure when the condenser is switched.

Referring to FIG. 6, a unitary condenser is indicated by dash lines D as comprising a layer of dielectric material 23 sandwiched between condenser electrodes 32 and 33 with the assembly of dielectric layer 23 and electrodes 32 and 33 being electrically connected between diodes 5′ and 6′. Diodes 5′ and 6′ are of a type similar in function and operation to elements 5 and 6 shown in FIG. 1A whereby each diode has an avalanche region of operation as shown in FIG. 1B. If it be assumed that diodes 5′ and 6′ correspond respectively to elements 5 and 6 shown in FIG. 1A and are connected as are elements 5 and 6, then the diodes present a high impedance to an electrical potential applied to leads 30 and 31 if this potential is lower than the avalanche potential of the diodes. If the potential becomes larger than the avalanche potential, diodes 5′ and 6′ become conductive. It is also to be understood that gas discharge tubes or other semi-conductive devices exhibiting an avalanche voltage may be used in place of diodes 5' and 6'.

Referring to FIG. 7, this figure is a schematic showing of a portion of a multicondenser structure or matrix 48 incorporating condensers according to the present invention. In order to keep the size of matrix 48 within reasonable limits insofar as the drawings of this application are concerned, only three matrix leads or strips 49 and 50 are shown in FIG. 7 but it will of course be understood by those skilled in the art that matrix 48 may comprise any practicable number of matrix leads or strips. Thus, the matrix may be 10 x 10, 100 x 100, or other size, depending upon the particular matrix application involved.

Matrix conductors or strips 49 and 50 are preferably positioned transversely with respect to each other as shown in FIG. 7 with a matrix strip 49 being spaced from a matrix strip 50 at each location or cross point 51 where a strip 49 crosses a strip 50. The spacing at each cross point is sufficient to accommodate a condenser 1 according to the present invention. FIG. 7 shows such a condenser associated with each cross point and the representation is such that the condenser is to be understood as being connected electrically between a matrix strip 49 and a matrix strip 50 at each cross point location 51. In other words, between a strip 49 and a strip 50 at each cross point location 51 will be located a condenser dielectric 2 preferably sandwiched between condenser electrodes 3 and 4 and this assembly is, in turn, sandwiched between avalanche electrodes 5 and 6. The condenser terminals 7 and 8 are connected, respectively, to a matrix strip 49 and a matrix strip 50. The reference numerals used to describe the condenser are therefore those shown in connection with the condenser according to FIG. 1A but could, of course, be condensers according to the showings of FIGS. 2–6.

From the description give above in connection with FIGS. 1A, 1B, and 1C it is evident that each cross point 51 of matrix 48 must have a voltage applied thereto in excess of the avalanche voltage of either element 5 or 6 of the condenser associated with said cross point if said condenser is to be switched in polarization. The coercive voltage required for condenser switching can therefore be raised to a value sufficient to eliminate effectively the switching of unselected cross points by fractional voltages below the avalanche voltage. This naturally improves the reliability of the matrix and effectively eliminates what can be termed as "matrix noise." For a more complete understanding of the problem of "matrix noise" and the difficulty of preventing switching of unselected cross points, reference is again made to my pending patent application Serial No. 381,347, filed September 21, 1953, now Patent No. 2,884,617, issued April 28 1959.

The matrix arrangement shown in FIGS. 8 and 9 is generally similar to that shown in FIG. 7, the principal difference being that in the arrangement according to FIGS. 8 and 9 the portion of the dielectric which is switched in polarization is free of the mechanical load of the avalanche electrodes. The matrix according to FIGS. 8 and 9 is designated generally by the reference numeral 52 and comprises a layer of dielectric material 53 (preferably a ferroelectric dielectric). A plurality of strongly adherent electrode members 54 are suitably attached (by evaporation for example) on one side of dielectric 53 while a corresponding number of electrodes 55 are suitably attached to the opposite side of the dielectric layer. The arrangement of each electrode 54 and its associated electrode 55 is such that they are preferably at right angles to each other as shown in FIG. 8 with the dielectric having a portion located between the cross-over location (or cross point) formed by electrodes 54 and 55. Each electrode 54 and 55 may be made of a material similar to that of which the electrodes 24 and 25 are shown in FIG. 2 are made.

A layer of electrically semi-conductive material 56 is in electrical connection with electrode 54 at a location on the electrode spaced away from the cross-over between electrodes 54 and 55. Correspondingly, a layer of electrically semi-conductive material 57 is in electrical connection with electrode 55. Finally, a conductive terminal portion 58 is connected to semi-conductive layer 56 and a corresponding terminal member 59 is connected to semi-conductive layer 57. Terminal members 58 and 59 may be in the form of common conductive strips as shown in FIGS. 8 and 9 provided that these strips are suitably separated or insulated from dielectric 53 so as to not interfere with the switching operation which is to take place at each cross point location where an electrode 54 crosses its associated electrode 55.

The semi-conductive layers 56 and 57 are made of a material such as that described in connection with semi-conductive layers 26 and 27 shown in FIG. 2. These semi-conductive layers 56 and 57 form with terminal members (or conductive strip members) 58 and 59, potential barriers arranged in electrical opposition to each other so as to provide the electrical characteristics shown in FIGS. 1B and 1C. In other words, the terminal members 58 and 59 form, with their associated semi-conductive layers 56 and 57, avalanche electrodes having a Zener region of operation. However, since the portion of the dielectric layer 53 which is located between the cross-over of electrodes 54 and 55 is spaced away from the avalanche electrodes, this dielectric layer portion is not subject to the mechanical load of the avalanche electrodes during switching of the polarization of this dielectric layer portion. This can be an advantage in maintaining domain stability.

FIGS. 10 and 11 show a holder for a dielectric wafer wherein avalanche electrodes are associated with the dielectric wafer and the unit condenser thus formed is housed within a protective envelope. Thus, referring more specifically to FIGS. 10 and 11, a pair of electrically conductive strips 60 and 61, of suitable metal for example, are shown as passing through an insulating base member 62. Strips 60 and 61 preferably have a length relation somewhat as shown in FIG. 10 whereby one of the strips extends beyond base 62 for a greater distance than the other strip.

A dielectric wafer or thin layer 63 has attached thereto, on opposite sides thereof as shown in FIGS. 10 and 11, a layer of electrically semi-conductive material 64 and a layer of electrically semi-conductive material 65. Layer 64a and 65a of electrically conductive material are attached to the outer surfaces of layers 64 and 65, respectively, as shown in FIGS. 10 and 11. An electrode 66 extends from semi-conductive layer 64 onto one surface of dielectric wafer 63, being securely adhered thereto so as to be in intimate contact with the dielectric wafer. This may be accomplished by utilizing a strongly adherent metal where the dielectric wafer is preferably a ferroelectric dielectric. Electrode strip 67 is attached firmly to the other side of dielectric wafer 63 and extends between this other side of the dielectric wafer and semi-conductive layer 65.

It is to be noted that electrode members or strips 66 and 67 are so disposed that they cross each other at location 68 and the portion of the dielectric wafer 63 located between strips 66 and 67 at this cross over (or cross point) location is the portion which is switched in polarization during operation of the condenser. Dielectric wafer 63 is preferably supported on conductive strips 60 and 61 by securing one edge of the wafer to strip 60 by a suitable solder joint 69, or the like, while another edge of the wafer is thus secured to strip 61 by a joint 70.

The peripheral shape of the dielectric wafer is not critical since the important consideration is that the semiconductive layer on one side of the dielectric wafer must be brought into electrically connected relation with one conductive strip while the semi-conductive layer on the other side of the dielectric wafer must be brought into electrically connected relation with the other conductive strip to provide two electrically opposite avalanche electrodes. Thus, in the arrangement shown in FIG. 10, the electrical path, going from conductive strip 60 to conductive strip 61, is seen as going from strip 60 to semiconductive layer 65 via layer 65a, electrode 67, dielectric wafer portion 63 located at location 68, electrode 66, semi-conductive layer 64, layer 64a, and conductive strip 61 via joint 70. The materials of which dielectric wafer 63, electrodes 66 and 67, semi-conductive layers 64 and 65, layers 64a and 65a, and conductive strips 60 and 61 are made will correspond to corresponding elements of the condensers, for example, shown in FIGS. 2 to 4 whereby each semi-conductive layer provides an avalanche electrode and the avalanche electrodes are arranged in electrically opposite relation to each other to provide the electrical characteristics shown in FIG. 1B. The condenser assembly containing the avalanche electrodes is finally coated with a protective layer against atmospheric influences and is housed in an envelope 71 which is cemented to, or otherwise suitably attached, to insulating base 62.

The unit condenser arrangement shown in FIGS. 12 and 13 is generally similar to the arrangement shown in FIGS. 10 and 11, the difference being that in the arrangement of FIGS. 12 and 13 the semi-conductive layers are deposited directly on the conductive strips rather than being deposited on the dielectric wafer. Thus, referring to FIGS. 12 and 13, it is noted that conductive strips 60 and 61 extend through insulating base 62 in the manner shown in FIGS. 10 and 11. A layer of electrically semiconductive material 72 is deposited on conductive strip 60 while a corresponding layer of electrically semi-conductive material 73 is deposited on conductive strip 61. This is in contrast with the arrangement shown in FIGS. 10 and 11 where the semi-conductive layers 64 and 65 are deposited on opposite sides of the dielectric wafer 63.

A layer of electrically conductive material 74 is deposited on semi-conductive layer 72 and an electrode 75 (corresponding to electrode 67 shown in FIG. 10) extends from conductive layer 74, being between layer 74 and one side of dielectric wafer 63. Of course, electrode 75 is firmly attached to one side of dielectric wafer 63, being deposited on one side of the dielectric wafer by an evaporation technique or the like if desired. Dielectric wafer 63 is held in place with respect to the assembly of semi-conductive layer 72 and conductive layer 74 by a suitable solder joint 76, or the like.

A conductive layer 77 is suitably secured to semi-conductive layer 73. Electrode 78 (which corresponds to electrode 66 shown in FIG. 10) is attached to the side of dielectric wafer 63 opposite from the side to which electrode 75 is attached and is arranged with respect to electrode 75 so that electrodes 75 and 78 cross each other to provide a cross point location 68 spaced away from the edges of the dielectric wafer and thus away from the junction between the dielectric wafer and each semi-conductive layer assembly. The portion of the dielectric wafer 63 which is switched during operation of the condenser is thus free of the mechanical load of the avalanche electrodes. Electrode 78 is joined to conductive layer 77 by a suitable solder joint 79, or the like. The entire assembly thus described is housed in an envelope 71 which is cemented to, or otherwise suitably secured to, insulating base 62.

The unit condenser of FIGS. 12 and 13 operates similarly to the condenser of FIGS. 10 and 11 in that the semi-conductive layers 72 and 73 provide in conjunction with conductive layers 74 and 77 avalanche electrodes arranged in electrically opposite relation to provide the electrical characteristics shown in FIG. 1B.

It will thus be seen that the present invention provides an electrical condenser which has improved retentivity stability even where the dielectric is a ferroelectric material which has not been usable heretofore in a memory condenser because of lack of sufficient nonlinearity in its hysteresis loop. The provision of avalanche electrodes in conjunction with a dielectric having dipoles which may be aligned and the alignment of which may be changed enables a degree of nonlinearity to be obtained which effectively isolates one cross point of a multicondenser structure or matrix from every other cross point of the matrix. Such isolation enables cross point selection to be accomplished to a degree unattainable before the present invention. This results in significant improvement in matrix operation and the practical elimination of matrix noise. Such reliability is extremely important in memory applications as will be readily understood by those skilled in the art.

The various figures of the drawings show the condenser dielectric as being sandwiched between condenser electrodes or avalanche electrodes. This is a convenient way to apply the electrically semi-conductive material to a dielectric wafer or thin layer. However, from the standpoint of the electrical characteristics shown in FIG. 1B, it is not necessary that an avalanche electrode be located on each side of the dielectric layer. Instead, both avalanche electrodes could be located on the same side of the dielectric layer. The important point is that the avalanche electrodes must be in electrical opposition to each other so that, irrespective of the direction of the applied voltage, the applied voltage will encounter the back impedance of an avalanche electrode. This provides a Zener region of operation so that the avalanche point or breakdown voltage must be reached before the condenser can be switched.

In some instances it may be desirable to have more than one avalanche electrode on each side of the dielectric layer. For example, the condenser dielectric can be sandwiched between plural pairs of avalanche electrodes. Furthermore, the plural avalanche electrodes on each side of the dielectric layer can have a common semi-conductive layer such as layer 26 and 27 described above in connection with FIGS. 3 and 4, for example. Where plural avalanche electrodes are provided on each side of the dielectric layer, they are connected so that an avalanche electrode on one side of the dielectric layer is connected in electrical opposition to an avalanche electrode on the other side of the dielectric layer to provide the electrical characteristics described above in connection with FIGS. 1B and 1C.

The condenser assemblies shown in FIGS. 10, 11 and 12, 13 have two condenser terminal members, or conductor strips 60 and 61, extending through the insulating base 62. However, in some cases, it may be desirable to provide direct electrical access to other parts of the condenser assembly located within envelope 71. For example, it may be desirable to have separate lead connectors connected to condenser electrode strips 66, 67 or 75, 78 and extending through the insulating base. The condenser assembly may therefore have four or more terminal members projecting from the insulating base rather than simply two members as shown in FIGS. 10, 11 and 12, 13.

Therefore, while I have described and illustrated embodiments of my invention, I wish it to be understood that I do not intend to be restricted solely thereto but that I do intend to cover all modifications thereof which would be apparent to one skilled in the art and which come within the spirit and scope of my invention.

What I claim as my invention is:

1. A condenser comprising a dielectric of material having electric dipoles therein which may be aligned and the alignment of which may be changed, said dielectric having a thin switching area portion surrounded by a thicker dielectric portion, a pair of condenser terminals, and an electrical potential barrier layer electrically interposed between each terminal and said thicker dielectric portion, said barrier layers being in electrically opposed relation to each other and being in non-contacting relation to said thin switching area portion whereby a gap exists between each barrier layer and said thin switching area portion.

2. A condenser comprising a ferroelectric dielectric sandwiched between a pair of metallic electrodes each made of a metal which, in cooperation with said dielectric, provides highly non-linear hysteresis loops, said dielectric consisting of a thin switching area layer surrounded by a thicker body layer and said metallic electrodes being in contact with both said thin switching area layer and the surrounding thicker body layer, a layer of electrically semi-conductive material joined to each electrode on the side thereof away from said thicker dielectric body layer, said layer of electrically semi-conductive material being out of contact with the portion of said electrodes which is in contact with said thin switching area layer, the junction between each layer of semi-conductive material and the electrode portion joined thereto presenting a high back impedance to an electrical potential applied to said junction in one direction and a low forward impedance to an electrical potential applied to said junction in the opposite direction.

3. A condenser according to claim 2 wherein each layer of electrically semi-conductive material is made of silicon.

4. A condenser comprising a ferroelectric dielectric sandwiched between a pair of metallic electrodes, each electrode being made of a metal which, in cooperation with said dielectric, provides highly non-linear hysteresis loops, a layer of electrically semi-conductive material joined to each electrode on the side thereof away from said dielectric, and a body of material joined to each layer of semi-conductive material on the side thereof away from said dielectric, the junction between each layer of semi-conductive material and said body of material joined thereto presenting a high back impedance to an electrical potential applied to said junction in one direction and a low forward impedance to an electrical potential applied to said junction in the opposite direction.

5. A condenser according to claim 2 wherein each electrode is made of metal and each layer of semi-conductive material is made of silicon.

6. A condenser according to claim 2 wherein each electrode is made of metal and each layer of semi-conductive material is made of germanium.

7. A condenser assembly comprising an insulating base, a pair of electrically conductive strips extending through said insulating base, a dielectric layer of ferroelectric material, a layer of electrically semi-conductive material joined to said dielectric layer on each side of said dielectric layer, a condenser electrode joined to each side of said dielectric layer and extending from the electrically semi-conductive layer on the same side of said dielectric layer, said electrodes crossing each other at a location away from said semi-conductive layers, means mounting said dielectric layer and said semi-conductive layers on said conductive strips, said semi-conductive layers and said dielectric layer being connected electrically in series with each other and said semi-conductive layers providing electrical potential barriers connected in electrically opposite relation to each other, said potential barriers having an avalanche characteristic, and a protective envelope secured to said insulating base and enclosing said dielectric layer and said semi-conductive layers.

References Cited in the file of this patent

UNITED STATES PATENTS

| | | |
|---|---|---|
| 2,416,864 | Bricker | Mar. 5, 1947 |
| 2,470,893 | Hepp | May 24, 1949 |
| 2,486,110 | Bugel et al. | Oct. 25, 1949 |
| 2,548,514 | Bramley | Apr. 10, 1951 |
| 2,695,397 | Anderson | Nov. 23, 1954 |
| 2,715,593 | Clark | Aug. 10, 1955 |
| 2,717,372 | Anderson | Sept. 6, 1955 |
| 2,717,373 | Anderson | Sept. 6, 1955 |
| 2,791,758 | Looney | May 7, 1957 |
| 2,791,759 | Brown | May 7, 1957 |
| 2,812,450 | Barney | Nov. 5, 1957 |
| 2,817,048 | Thuermel et al. | Dec. 17, 1957 |
| 2,854,590 | Wolfe | Sept. 30, 1958 |
| 2,876,435 | Anderson | Mar. 3, 1959 |
| 2,876,436 | Anderson | Mar. 3, 1959 |

OTHER REFERENCES

Bell System Technical Journal, July 1954, vol. 33, No. 4 (pp. 833 and 834 relied on).

Report R212, Ferroelectrics for Digital Information Storage and Switching, by D. A. Buck, published by Massachusetts Institute of Technology, June 5, 1952 (pp. 20 and 21 fig. 21 relied on).